Patented July 17, 1951

2,561,153

UNITED STATES PATENT OFFICE 2,561,153

SOLUBLE BINARY COPOLYMERS OF ALLYLIC MONOETHERS AND POLY - 2 - ALKENYL ESTERS

Pliny O. Tawney, Passaic, N. J., assignor to United States Rubber Company, New York, N. Y., a corporation of New Jersey No Drawing. Application June 29, 1948,
Serial No. 35,981

2 Claims. (Cl. 260—78.5)

1

The invention relates to a new class of soluble and unsaturated binary interpolymers of a poly-2-propenyl ester of a polybasic acid with a 2-propenyl monoether of a non-enic alcohol or 2-propenyl monoester of a non-enic carboxylic acid. These new resins are capable of being converted to an insoluble and essentially infusible state by further polymerization or copolymerization.

The polymerization of poly-2-alkenyl esters of polybasic acids, e. g., diallyl fumarate, dimethallyl oxalate and diallyl carbonate, is known to yield insoluble, cross-linked polymers before more than a minor proportion of the poly-2-alkenyl ester has been converted to the polymeric form. The resulting heterogeneous mixture of insoluble gel, low molecular weight polymer and unreacted monomer is not only difficult to manipulate but is virtually useless for most commercial applications, e. g., impregnating, coating and molding, which require a uniform, initially soluble, fusible resin capable of being subsequently cured to an insoluble, infusible state. A soluble polymer of the poly-2-alkenyl ester can be obtained, albeit in low yields, by halting the polymerization before gelation occurs. However, the resulting polymer must be purified to remove unreacted starting material and the latter itself must be isolated, purified and recycled for use in subsequent polymerizations. To improve the unfavorable economic features of such a process it has been suggested that the conversion of a monomeric poly-2-alkenyl ester to the soluble polymeric form be increased by various devices such as carrying out the reaction at high temperatures and/or in the presence of large amounts of diluents, catalysts, inhibitors, etc. Actually such devices effect only small or insignificant increases in the yield of soluble polymer and at further expense, since it must be extensively purified to remove solvents, inhibitors, and catalyst fragments in order to retain the desirable properties of the resin.

I have now unexpectedly discovered that the difficulties heretofore encountered by the prior art in the polymerization of a poly-2-alkenyl ester can be successfully overcome by carrying out the polymerization in the presence of a copolymerizable 2-alkenyl ether or ester as defined above. Moreover, in contrast to the prior art, my interpolymerization proceeds readily at moderate temperatures and in the absence of special reaction conditions and precautions heretofore employed by the art in attempts to delay or avert gelation. Since my new products are more uniform and homogeneous in character, elaborate

2 and expensive purification procedures are usually unnecessary.

My acetone-soluble interpolymers are to be understood as distinctive from the homopolymers of each of the monomers in that my interpolymers each consist of a substantial number or plurality of recurring units of the chemical elements of each of the monomers which are chemically combined in the interpolymer.

My new interpolymers are superior to interpolymers of poly-2-alkenyl esters and 2-alkenyl alcohols in that they provide softer and more flexible products of a higher degree of resistance to wetting and attack by hydroxylic solvents.

The copolymerizable 2-alkenyl monoethers and monoesters which are useful in my invention can be represented by the type formula $$RCH{=}CR{-}CH_2X$$

wherein one R is H and the other R is selected from the class consisting of methyl, ethyl, chlorine, chloromethyl, and phenyl; and X is selected from the class consisting of alkoxy (e. g., methoxy, ethoxy, beta-hydroxyethoxy, propoxy, isopropoxy, butoxy, amyloxy, hexoxy, cyclohexoxy, and decoxy), aryloxy (e. g., phenoxy, p-chlorophenoxy, tolyloxy, and naphthoxy), aralkoxy (e. g., benzyloxy, and beta-phenylethoxy), and acyloxy, in which the acyl group is devoid of olefinic and acetylenic unsaturation (e. g., acetoxy, propionoxy, butyroxy, isobutyroxy, valeryloxy, caproyloxy and benzoyloxy). Illustrative of such compounds are allyl methyl ester, methallyl ethyl ether, 2-chloroallyl octyl ether, 2-ethallyl decyl ether, methallyl phenyl ether, allyl benzyl ether, allyl acetate, allyl chloroacetate, methallyl propionate, 2-choroallyl butyrate, allyl caprylate, allyl benzoate and methallyl p-chlorobenzoate. Preferably it is the terminal R which is H.

The 2-alkenyl monoethers tend, with few exceptions, to be more effective than the 2-alkenyl esters in averting gelation of the polymerizing poly-2-alkenyl ester; they also yield interpolymers of optimum resistance to wetting and attack by hydroxylic solvents such as water and alcohol, although the 2-alkenyl monoesters are nearly equivalent to the 2-alkenyl monoethers in this latter respect. Both the 2-alkenyl monoethers and the monoesters are useful in endowing the interpolymers with improved flexibility, and this can be enhanced by using the 2-alkenyl ethers and esters of long chain alcohols and long chain carboxylic acids, respectively.

I have found that in the practice of my invention the presence of as little as 0.2 mole of the interpolymerizable 2-alkenyl monoether or monoester per mole of the poly-2-alkenyl ester is sufficient to effect a marked increase in the conversion of the latter monomer to the soluble polymeric form. As the proportion of the 2-alkenyl monoether or monoester in the initial reaction mixture is increased to about 3-5 moles, the major proportion of the poly-2-alkenyl ester can be converted to the soluble polymeric form, and even higher yields may be obtained as the amount of the 2-alkenyl monoether or monoester is further increased up to 7 moles.

The poly-2-alkenyl esters which are operable in my invention are the esters of polybasic acids with 2-alkenyl alcohols including allyl, 2-methallyl, 2 - ethallyl, 2 - chloroallyl, 2 - (hydroxymethyl) allyl, 2 - (chloromethyl) allyl, tiglyl, crotyl, 4-chlorocrotyl, and cinnamyl alcohols, of which those containing the terminal methylene group are preferred, e. g., allyl, methallyl and ethallyl alcohols.

One preferred class of poly-2-alkenyl esters are those derived from olefinic polycarboxylic acids, particularly alpha-olefinic polycarboxylic acids such as fumaric, itaconic, maleic, mesaconic, citraconic, and aconitic acids. Of these, the poly-2-alkenyl fumarates, e. g., diallyl fumarate, are especially preferred because of their availability, cheapness, the speed with which they interpolymerize according to my invention, and the high yields of soluble polymeric products obtainable therefrom. Another class of poly-2-alkenyl esters are those derived from the non-enic polycarboxylic acids, e. g., oxalic, malonic, succinic, glutaric, adipic, sebacic, azelaic and tricarballylic. Of this class the poly-2-alkenyl esters of the shorter-chained acids, e. g., diallyl oxalate and dimethallyl succinate, tend to yield interpolymers which after being cured are harder and more solvent-resistant, whereas the poly-2-alkenyl esters of the longer-chained acids, e. g., diallyl suberate, tend to yield softer and more flexible interpolymers. A third class of poly-2-alkenyl esters are those derived from inorganic acids, e. g., diallyl sulfate and dimethallyl carbonate, and particularly those derived from the tri- and tetra-valent inorganic acids, e. g., triallyl phosphate, tetramethallyl silicate, tetraallyl stannate, and tetra-methallyl titanate. The latter group are of particular interest in my invention for the preparation of flame-resistant interpolymers capable of withstanding high temperatures, for use in baking enamels.

The method of my invention comprises heating a mixture of the poly-2-alkenyl ester with from 0.2 to 8, and preferably from 2.5 to 6 molar equivalents of the 2-alkenyl monoether or the 2-alkenyl monoester as previously defined, at temperatures of from 25° to 125° C., and preferably from 50° to 110° C., for times sufficient to effect an adequate degree of reaction, such times being ordinarily in the range of from 2 to 200 hours or more, and more usually from 2 to 150 hours. The reaction is promoted by free radicals including peroxidic compounds such as benzoyl peroxide, acetyl peroxide and tertiary-butyl hydroperoxide, such promoters being ordinarily employed in amounts of from 0.1 to 15%, usually 0.1 to 10%, by weight of the reactant mixture. The course of the reaction can be followed by determining from time to time the increase in the viscosity of the reaction mixture. The interpolymer is isolated by precipitation through addition of a non-solvent or by removing any unreacted starting materials by extraction or distillation. Although it is unnecessary for the majority of commercial applications, the interpolymer may be further purified, if desired, e. g., for analytical purposes or for optical applications, by dissolving it in a minimum volume of the solvent such as acetone and reprecipitating it by the addition of a non-solvent, e. g., n-hexane.

My new interpolymers can be employed in the solid form as thermosetting molding powders for the preparation of various industrial shapes including rods, blocks and sheets. They may be also employed as coating, laminating and impregnating compositions by dissolving them in appropriate solvents. For such purposes the crude interpolymerization reaction mixtures can themselves be employed by the addition of higher-boiling solvents and subsequent distillation to remove any of the unreacted 2-alkenyl monoether or monoester. My interpolymers can likewise be dissolved in a number of liquid ethylenically unsaturated copolymerizable compounds, e. g., methyl arcylate, butyl acrylate, benzyl acrylate, diethyl fumarate, vinyl butyrate, diallyl fumarate and allyl acrylate to yield solutions capable of being totally polymerized without leaving any solvent to be evaporated. The latter are of particular interest in applications where removal of a diluent from a coating or impregnating composition is uneconomical or provides a technical or a health hazard. These solutions are likewise useful in molding operations where an initially fluid composition is required which can be ultimately set or cured in a final shape with a minimum of shrinkage.

Heating compositions containing my interpolymers at such temperatures as 60–150° C., or higher, particularly in the presence of catalysts, induces further polymerization whereby the products are rendered substantially infusible as well as resistant to attack by solvents such as acetone and xylene. Suitable inert addends including dyes, pigments, fillers and plasticizers can be incorporated with my new interpolymers preferably in the soluble, fusible stage prior to the final cure.

The following examples disclose my invention in more detail. All parts are by weight.

EXAMPLE 1

Mixtures of various poly-2-alkenyl esters and 2-alkenyl monoethers and monoesters are heated at 60° C. in the presence of benzoyl peroxide as a promoter until in each case the point of incipient gelation is attained or until no further increase in the viscosity of the reaction mixture is detectable. The reaction mixtures are then diluted with an excess of n-hexane and the precipitated materials are further purified by repeated solution in a minimum volume of acetone and precipitation with an excess of n-hexane. The products are finally dried in vacuo to constant weight.

In Table I below are summarized the amounts of the starting materials, of peroxide, and of polymeric product obtained; and to emphasize the advantages of my invention the polymerization of various poly-2-alkenyl esters according to the prior art, i. e., in the absence of my 2-alkenyl monoethers and monoesters, is likewise included (I-1, 3, 19, 28, 36, 38, 40).

Table I

| | Poly-2-Alkenyl Ester | Amt. | 2-Alkenyl Ether or Ester | Amt. | Benzoyl Peroxide | Reaction Time (hours) | Polymeric Product |
|---|---|---|---|---|---|---|---|
| 1 | Diallyl Fumarate | 100 | | | 1.0 | 4.25 | 9.0 |
| 2 | ...do... | 100 | Allyl Ethyl Ether | 11.0 | 1.54 | 2.25 | 16.6 |
| 3 | ...do... | 100 | ...do... | 44.0 | 2.47 | 4.8 | 31.8 |
| 4 | ...do... | 100 | (¹) | 44.0 | 2.47 | 2.5 | 17.4 |
| 5 | ...do... | 100 | Allyl Ethyl Ether | 132.0 | 4.95 | 8.5 | 61.8 |
| 6 | ...do... | 100 | ...do... | 176.0 | 6.19 | 13.3 | 75.0 |
| 7 | ...do... | 100 | ...do... | 255.0 | 8.32 | 24.5 | 100.0 |
| 8 | ...do... | 100 | ...do... | 396.0 | 12.35 | ² 60.0 | 121.0 |
| 9 | ...do... | 100 | Methallyl Ethyl Ether | 51.0 | 2.46 | 4.5 | 30.8 |
| 10 | ...do... | 100 | ...do... | 100.0 | 2.0 | 8.95 | 54.4 |
| 11 | ...do... | 100 | ...do... | 186.0 | 4.0 | 11.0 | 69.0 |
| 12 | ...do... | 100 | ...do... | 204.0 | 6.18 | 14.1 | 76.1 |
| 13 | ...do... | 100 | ...do... | 287.0 | 6.8 | 40.5 | 101.0 |
| 14 | ...do... | 100 | Methallyl Heptyl Ether | 86.8 | 2.48 | 23.3 | 30.0 |
| 15 | ...do... | 100 | ...do... | 244.0 | 4.50 | 61.0 | 77.1 |
| 16 | ...do... | 100 | Methallyl Acetate | 100.0 | 2.0 | 7.1 | 26.4 |
| 17 | ...do... | 100 | Allyl Acetate | 100.0 | 4.0 | 13.25 | 32.2 |
| 18 | ...do... | 100 | Allyl Chloracetate | 204.0 | 2.0 | 3.50 | 38.9 |
| 19 | Diallyl Maleate | 100 | | | 1.23 | 7.0 | 18.4 |
| 20 | ...do... | 100 | Methallyl Ethyl Ether | 69.0 | 2.0 | ² 44.0 | 43.0 |
| 21 | ...do... | 100 | ...do... | 100.0 | 4.0 | ² 144.0 | 54.2 |
| 22 | ...do... | 100 | Methallyl Acetate | 58.1 | 2.45 | 16.5 | 38.0 |
| 23 | ...do... | 100 | ...do... | 69.0 | 2.0 | ² 34.0 | 52.3 |
| 24 | ...do... | 100 | ...do... | 100.0 | 4.0 | 30.25 | 64.4 |
| 25 | ...do... | 100 | ...do... | 175.0 | 4.9 | 41.75 | 77.0 |
| 26 | ...do... | 100 | Allyl Acetate | 69.0 | 2.6 | 15.50 | 32.6 |
| 27 | ...do... | 100 | ...do... | 153.0 | 4.9 | 33.75 | 63.5 |
| 28 | ...do... | 100 | Allyl Chloroacetate | 200.0 | 8.0 | 81.0 | 100.8 |
| 29 | Diallyl Itaconate | 100 | | | 1.14 | 1.2 | 9.7 |
| 30 | ...do... | 100 | Methallyl Ethyl Ether | 92.0 | 2.0 | 28.0 | 78.0 |
| 31 | ...do... | 100 | ...do... | 100.0 | 2.0 | 16.1 | 59.6 |
| 32 | ...do... | 100 | ...do... | 156.0 | 4.0 | ² 34.0 | 77.5 |
| 33 | ...do... | 100 | Methallyl Acetate | 92.0 | 2.0 | 13.3 | 39.2 |
| 34 | ...do... | 100 | ...do... | 100.0 | 2.0 | 8.9 | 39.6 |
| 35 | ...do... | 100 | Allyl Chloracetate | 257.0 | 4.0 | 10.9 | 98.8 |
| 36 | Diallyl Oxalate | 100 | | | 5.7 | 12.5 | 3.2 |
| 37 | ...do... | 100 | Methallyl Ethyl Ether | 100.0 | 8.0 | 72.0 | 35.4 |
| 38 | Diallyl Adipate | 100 | | | 2.0 | 29.3 | 20.1 |
| 39 | ...do... | 100 | Methallyl Acetate | 100.0 | 8.8 | 56.0 | 58.4 |
| 40 | Triallyl Aconitate | 100 | | | 1.0 | ² 144.0 | 35.6 |
| 41 | ...do... | 100 | Methallyl Acetate | 100.0 | 5.0 | ² 60.0 | 46.1 |

¹ Benzene substituted for the 2-Alkenyl ether or ester.
² No evidence of incipient gelation.

From Table I it is apparent that the polymerization of the poly-2-alkenyl ester in the presence of even a small amount of the 2-alkenyl monoether or monoester effects a significant increase in the amount of the monomeric poly-2-alkenyl ester converted to the soluble polymeric form. Moreover, it is evident that this amount of conversion is increased in the presence of increased amounts of the 2-alkenyl monoether or monoester until in the presence of a sufficient quantity of the latter the major proportion of the poly-2-alkenyl ester can be readily converted to the soluble polymeric form without danger of gelation.

EXAMPLE 2

A mixture of 98 parts of diallyl fumarate, 284 parts of methallyl ethyl ether and 7.06 parts of benzoyl peroxide is heated at reflux for 10 hours. The viscous reaction mixture is purified for analytical purposes by cooling it and pouring it into n-hexane. The precipitated copolymer is further purified by repeated solution in acetone and precipitation with n-hexane, and after drying to constant weight in vacuo, 114.5 parts of polymeric solid are obtained which is readily soluble in acetone, chloroform, ethyl acetate, benzene, carbon tetrachloride, and an 80:20 mixture of xylene and butanol.

*Analysis.*—Found: C, 64.4%; H, 7.89%; iodine number (Wijs) 128.8.

The carbon analysis corresponds to a copolymer containing approximately 69.6% by weight of diallyl fumarate and 30.4% of methallyl ethyl ether. The iodine number indicates the large amount of residual unsaturation which is available for further polymerization.

(a) Four parts of the copolymer are dissolved in 4 parts of an 80:20 xylene-butanol mixture containing 0.2 part of carbitol acetate, and flowed onto a glass panel. After baking for 20 minutes at 200° C., a clear, hard, solvent-resistant film is obtained.

EXAMPLE 3

Example 2 is repeated, and 50 parts of the crude copolymerization reaction mixture are evaporated at 25° C. and 2 mm. pressure to a thick syrup, after which 3 parts of cyclohexanone and 50 parts of xylene are added and the evaporation continued until approximately 38.7 parts of resin solution are obtained. The solution is then diluted by the addition of 12.8 parts of xylene, and 2.63 mls. of a 0.6% solution of cobalt drier are incorporated therein. (This cobalt solution is obtained by adding 9 parts of xylene to 1 part of a solution of cobalt as cobalt naphthenate dissolved in hydrocarbon solvents.) A sample of the solution is poured onto a glass panel and baked at 100° C. for 12 minutes, by which time the film is tack-free, and then for an additional 13 minutes after which the film is completely insoluble in acetone and adheres firmly to the panel.

(a) Ninety-five parts of the original crude copolymerization reaction mixture are admixed with 12.0 parts of monomeric diethyl fumarate. Unreacted methallyl ethyl ether is then removed by evacuation at 30° C. and 1 mm. pressure, and the resulting solution is cooled and admixed with 0.98 part of benzoyl peroxide. A sample of this solution is cured in a plate mold by heating for 15 hours at 60° C. and then for 2 hours at 90° C. to form a clear, insoluble, infusible sheet.

(b) Another sample of the solution prepared in (a) above is cured in the presence of air by pouring it into a coverless mold and heating at 90° C. After 60 minutes the solution has become converted to a clear, colorless solid which is insoluble and infusible and is tack-free even when hot.

(c) Eighty parts of the original crude copolymerization reaction mixture are admixed with 30 parts of diethyl fumarate. The unreacted methallyl ethyl ether is evacuated as above and, after the addition of 1.0 part of benzoyl peroxide, the viscous syrup is cured in a plate mold by heating for 24 hours at 60° C. and then for 2 hours at 120° C. The resulting product is a clear, tough, colorless sheet which is resistant to both heat and solvents.

(d) When a mixture of 20 parts of the crude copolymerization reaction mixture with 45 parts of diethyl fumarate is treated as in (a) above, the crude sheet is clear, markedly flexible, and resistant to attack by solvents.

EXAMPLE 4

A mixture of 196 parts of diallyl fumarate, 667 parts of methallyl ethyl ether and 18.54 parts of benzoyl peroxide is heated at 85-90° C. for 10 hours. The reaction mixture is evaporated to a thick syrup at 25° C. and 4 mm. pressure, and after the addition of 400 parts of xylene the evaporation is continued until approximately 448 parts of resin solution are obtained. To 440 parts of this solution are added 32 parts of n-butanol and 52 parts of an 80:20 xylene-butanol mixture. One hundred parts of the resulting solution are mixed with 15 parts of titanium dioxide on a 3-roll paint mill, and 10 parts of this paste are admixed with 16 parts of the unpigmented resin solution and 2.1 mls. of the cobalt drier solution described in Example 3 above. The resulting enamel is flowed onto a metal panel and baked at 100° C. for 30 minutes to yield an adherent, glossy, white, tack-free coating. The gloss is not destroyed by heating for an additional 30 minutes during which time the coating has become completely insoluble in acetone.

EXAMPLE 5

Forty-nine parts of diallyl fumarate are admixed with 193.5 parts of allyl ethyl ether and 6.04 parts of benzoyl peroxide, and the mixture is heated at reflux for 15 hours.

(a) Sixty parts of the crude reaction mixture are evacuated at room temperature and 3 mm. pressure to a thick syrup which is then admixed with 30 parts of xylene and 2 parts of carbitol acetate and further evacuated until 40 parts of resin solution are finally obtained. This solution is divided in half and one portion is spread on a glass panel and baked for 10 minutes at 200° C. to yield a tough, clear, and colorless film which is resistant to solvents. The remaining half of the resin solution is admixed with 1.75 cc. of the cobalt solution described in Example 3 above, and baked in a film at 100° C. The coating is tack-free in 8 minutes and completely cured after heating for 20 minutes.

(b) One hundred parts of the original copolymerization reaction mixture are admixed with 11.3 parts of diethyl fumarate and evacuated at 35° C. and 3 mm. pressure until 45 parts of residual syrup are obtained. A solution of 0.9 part of benzoyl peroxide in 8.5 parts of benzene is then added and after removal of the benzene by evacuation at room temperature, the resulting solution is cured in a plate mold by heating at 70° C. for 15 hours and then at 120° C. for 2 additional hours. The resulting cured sheet is clear, somewhat flexible and displays good solvent-resistance.

EXAMPLE 6

In the manner of previous examples a mixture of 100 parts of diallyl fumarate, 204 parts of allyl chloroacetate and 2.0 parts of benzoyl peroxide is heated at 60° C. for 3.5 hours and from the reaction mixture are isolated 38.9 parts of solid interpolymer having an iodine number (Wijs) of 89.5.

Three and one-half parts of the interpolymer are dissolved in 1.3 parts of diethyl fumarate together with 0.04 part of benzoyl peroxide. The resulting solution is poured into a cylindrical mold and cured by heating at 60° C. for 24 hours and then for 20 additional hours at 90° C. The resulting hard casting is resistant to attack by ethanol and acetone.

*Example 7*

A mixture of 19.6 parts of diallyl fumarate, 90.0 parts of allyl acetate and 1.5 parts of tertiary-butyl hydroperoxide is refluxed for 4 hours. Any unreacted allyl acetate is removed by evaporation and the residue is further purified by dilution with n-hexane, and redissolving the precipitated copolymer in a minimum volume of acetone followed by reprecipitation with n-hexane. After drying in vacuo to constant weight, 14.6 parts of polymeric solid are obtained whose analyses (60.60% C; 6.78% H; and 17.3% acetic acid) indicate a copolymer containing approximately 71.3% by weight of diallyl fumarate and 28.7% of allyl acetate. The high amount of residual unsaturation extant in the copolymer is indicated by the iodine (Wijs) number, 138.9. The copolymer is soluble in acetone, chloroform, carbon tetrachloride, benzene, xylene and dioxane.

Five parts of the copolymer are dissolved in 2.25 parts of diethyl fumarate together with 0.145 part of benzoyl peroxide. The mixture is poured into a cylindrical mold and cured by heating for 22 hours at 60° C., 3 hours at 90° C., and 2 hours at 120° C. to yield a clear acetone-insoluble casting. (Rockwell hardness, L-116, M-115).

*Example 8*

(a) In the manner of previous examples a mixture of 29.4 parts of diallyl fumarate, 120.7 parts of methallyl butyrate and 1.5 parts of tertiary-butyl hydroperoxide is heated at 120° C. for 4 hours to yield 49.2 parts of a copolymer containing approximately 46.2% by weight of diallyl fumarate and 53.8% of methallyl butyrate. (64.55% C; 8.20% H; iodine number, 70.0.)

(b) A film poured on a glass plate from a solution of 5 parts of the copolymer in 2.5 parts of xylene is cured to a clear, colorless, acetone-impervious coating by baking at 200° C. for 30 minutes.

(c) Five parts of the copolymer are dissolved in 2.25 parts of diethyl fumarate together with 0.145 part of benzoyl peroxide and the solution is cured in a cylindrical mold by heating at 60° C. for 24 hours, 90° C. for 1 hour and 120° C. for 3 hours. The resulting clear casting is insoluble in acetone and has a Rockwell hardness of L-91, M-84.

(d) Example 8-c is repeated using butyl acrylate in place of the diethyl fumarate. The resulting acetone-insoluble casting has a Rockwell hardness of L-59, M-61.

Having thus described my invention, what I claim and desire to protect by Letters Patent is:

1. A method of preparing acetone-soluble binary interpolymers which comprises heating, in the presence of a peroxidic compound catalyst, a binary mixture of monomers consisting solely of diallyl fumarate and a copolymerizable monomer of the formula $RCH=CR-CH_2X$ where one R is hydrogen and the other R is a member from the class consisting of alkyl, halogen, haloalkyl, and aryl; X being from the class consisting of alkoxy, alkenyloxy, aryloxy, aralkoxy, and saturated aliphatic acyloxy radicals, the proportion of the said formulated copolymerizable compound being 2.5 to 6 molar equivalent per mole equivalent of the fumarate.

2. A method of making an acetone-soluble binary interpolymer which comprises heating a binary mixture of monomers consisting solely of monomeric methallyl alkyl ether and monomeric diallyl fumarate, in the presence of a peroxidic compound catalyst, the proportions being from 2.5 to 6 moles of the methallyl alkyl ether to one mole of the diallyl fumarate.

PLINY O. TAWNEY.

REFERENCES CITED

The following references are of record in the file of this patent:

UNITED STATES PATENTS

| Number | Name | Date |
|---|---|---|
| 2,332,461 | Muskat et al. | Oct. 19, 1943 |
| 2,332,900 | D'Alelio | Oct. 26, 1943 |
| 2,378,195 | D'Alelio | June 12, 1945 |
| 2,378,197 | D'Alelio | June 12, 1945 |
| 2,403,213 | D'Alelio | July 2, 1946 |
| 2,430,109 | D'Alelio | Nov. 4, 1947 |
| 2,431,373 | D'Alelio | Nov. 25, 1947 |
| 2,431,374 | D'Alelio | Nov. 25, 1947 |